United States Patent [19]

Yolles

[11] 3,857,964
[45] Dec. 31, 1974

[54] CONTROLLED RELEASE FLAVOR COMPOSITIONS

[75] Inventor: Seymour Yolles, Newark, Del.

[73] Assignee: David E. Brook, Acton, Mass. ; a part interest

[22] Filed: Feb. 9, 1973

[21] Appl. No.: 331,324

[52] U.S. Cl..................... 426/3, 426/175, 426/221, 426/222, 426/223, 426/96
[51] Int. Cl............................................... A23g 3/00
[58] Field of Search ............... 426/3, 5, 6, 221, 222, 426/223, 97, 103, 175

[56] References Cited
UNITED STATES PATENTS

| | | | |
|---|---|---|---|
| 2,778,738 | 1/1957 | Fagan | 426/223 |
| 3,666,496 | 5/1972 | Honey et al. | 426/223 |
| 3,681,089 | 8/1972 | Gould et al. | 426/223 |
| 3,795,744 | 3/1974 | Ogawa et al. | 426/221 |

Primary Examiner—Samih N. Zaharna
Assistant Examiner—J. M. Hunter
Attorney, Agent, or Firm—David E. Brook

[57] ABSTRACT

Controlled release flavor compositions are disclosed which comprise flavor particles having an outer coating of a physiologically inert, water-softenable and swellable material. The flavor particles are formed from an intimate dispersion of flavor acetal or ketal in physiologically inert polymeric binders. The flavor acetals or ketals comprise the reaction product of a flavor aldehyde or flavor ketone and a polyhydroxy compound such as glycerine.

The release of flavor in these compositions has three levels of control. These are: (1) hydrolysis of the flavor acetal or ketal; (2) diffusion through the polymeric matrix; and, (3) diffusion through the outer coating surrounding the flavor particle. Controlled release flavor compositions, as described herein, are particularly useful in chewing gums.

17 Claims, No Drawings

CONTROLLED RELEASE FLAVOR COMPOSITIONS

BACKGROUND OF THE INVENTION

1. Field of the Invention

This invention relates to controlled release flavor compositions and more particularly to controlled release flavor compositions having multiple levels of control over flavor release.

2. Description of the Prior Art

It is known that with most flavored chewing gums the perception of flavor drops off sharply after a short initial period of chewing. It has also been noted that large amounts of the flavor incorporated into chewing gums are retained and never perceived by the chewer. Therefore, for chewing gum and many other applications, it would be advantageous if the release of flavors could be controllably released continuously and at a desirable level over a predetermined period of time.

One approach used to achieve improved sustained release of flavors has been to encapsulate the flavors prior to their incorporation into chewing gum. Corbin, U.S. Pat. No. 3,201,353, discloses the use of micro-inclusions containing flavors for chewing gums. In another patent, Pilotti, U.S. Pat. No. 3,011,949, it is taught that the controlled release of active ingredients from slab chewing gum can be achieved by coating solid particles of active flavor ingredients with a sugar solution, drying the coating, pulverizing the coated particles and mixing the pulverized material with the other constituents of slab chewing gum. Other techniques have been to use gelatin-coacervated flavors (Pat. No. 2,886,449), gelatin encapsulated flavors (Pat. No. 2,886,446), or gelatin metaphosphate encapsulated microdroplets of flavors (Pat. No. 2,886,444), within an all-enveloping mass of chewable base. Despite the great amount of research done to control the release of flavors by encapsulation techniques, none of the methods previously known has proven totally successful to date.

A different technique for producing sustained release of flavors is disclosed in Heggie, Pat. No. 2,596,852. By this method, permanently flavored gums are formed by using gum bases formed from vinyl acetate copolymerized with vinyl unsaturated flavors. This technique, however, is severely limited by the number of vinyl unsaturated flavors available, and also because incorporation of flavors into the polymer chain tends to destroy the flavor producing characteristics of the flavor monomer. That is, once incorporated as part of the polymer via vinyl polymerization, the flavor molecule is so altered as to become an inseparable part of the polymer.

The need exists, therefore, for new controlled release flavors, such as those having multiple levels of control over flavor release as described herein.

SUMMARY OF THE INVENTION

In one embodiment, a controlled release flavor composition having three levels of control over flavor release can be prepared.

A first level of controllable flavor release is achieved by forming the reaction product between a polyhydroxy compound, such as glycerine, and an aldehyde or ketone flavor. Thus, flavor acetals or ketals are formed which depend upon hydrolysis for flavor release.

A second level of control over flavor release is achieved by forming a flavor particle from the flavor acetals or ketals. This is accomplished by forming an intimate dispersion of the flavor acetal or ketal in a polymeric binder or matrix. One suitable technique for forming flavor particles is to form a melt heating together the flavor acetal or ketal with a suitable polymer and subsequently cooling the blend. For use in chewing gums, it is desirable to provide flavor particles from the intimate dispersion, and this can be achieved by any suitable technique for forming prills, particles, etc. from the above-described melt, or by crushing the cooled blend to the proper particle size.

A third level of control over a flavor release is achieved by coating the flavor particles with an outer coating of a physiologically inert, water-softenable and swellable material. Thus, even after the flavor acetal or ketal has diffused through the polymer matrix, the outer coating provides still an additional level of control over flavor release.

The controlled release flavor compositions of this invention have many advantages over those heretofore known. Controlled release can be sustained, for example, over much longer periods than with present techniques used in chewing gums. Additionally, the grainy sensation present with most coated flavor particles is not experienced because of the softenable or swellable nature of the outer coating. These compositions even provide the formulator with the capability of releasing entirely different flavors at different times. Thus, a first flavor could be released by the outer coating and polymer matrix with a second flavor being released upon hydrolysis of the flavor acetals or ketals. This type of flexibility has simply not been available in controlled release flavor compositions heretofore.

DESCRIPTION OF THE INVENTION

The first step in preparing the controlled flavor release compositions described herein is the formation of a flavor acetal or ketal. This is accomplished by reacting a polyhydroxy compound with a flavor aldehyde or flavor ketone.

Suitable polyhydroxy compounds include low molecular weight compounds such as glycerine, propylene glycol, sorbitol, mannitol, etc. Additionally, polymeric polyhydroxy materials are suitable, and include partially hydrolyzed polyvinyl acetate, partially hydrolyzed copolymers of polyvinyl acetate and polyvinyl alcohol, hydroxy propyl cellulose, hydroxy propyl alginates, etc. To be suitable, of course, both the flavor and polyhydroxy compounds must be physiologically inert and edible.

Examples of suitable aldehyde flavors include, but are not limited to: acetaldehyde (apple); benzaldehyde (cherry, almond); anisic aldehyde (licorice, anise); cinnamic aldehyde (cinnamon); citral, i.e., alpha citral (lemon, lime); neral, i.e., beta citral (lemon, lime); decanal (orange, lemon); ethyl vanillin (vanilla, cream); heliotropine, i.e., piperonal (vanilla, cream); vanillin (vanilla, cream); α-amyl cinnamaldehyde (spicy fruity flavors); butyraldehyde (butter, cheese) valeraldehyde (butter, cheese); citronellal (modifies, many types); decanal (citrus fruits); aldehyde C–8 (citrus fruits); aldehyde C–9 (citrus fruits); aldehyde C–12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl5-heptenal, i.e., Melonal (melon); 2,6-dimethyloctanal (green fruit); and, 2-dodecenal (citrus, mandarin).

Examples of suitable ketone flavors include, but are not limited to: d-carvone (caraway); l-carvone (spearmint); diacetyl (butter, cheese, "cream"); benzophenone (fruity and spicy flavors, vanilla); methyl ethyl ketone (berry fruits); maltol (berry fruits) menthone (mints) methyl amyl ketone, ethyl butyl ketone, dipropyl ketone, methyl hexyl ketone, ethyl amyl ketone (berry fruits, stone fruits); pyruvic acid (smokey, nutty flavors); acetanisole (hawthorn heliotrope); dihydrocarvone (spearmint); 2,4-dimethyl-acetophenone (peppermint); 1,3-diphenyl-2-propanone (almond); acetocumene (orris and basil, spicy); isojasmone (jasmine); d-isomethylionone (orris-like, violet); isobutyl acetoacetate (brandy-like); zingerone (ginger); pulegone (peppermint - camphor); d-piperitone (minty); and, 2-nonanone (rose and tea-like).

The literature contains much information on the preparation of acetals and ketals and those skilled in the art should have no problem in ascertaining the proper reaction conditions. Among the literature references are: Wagner and Zook, *Synthetic Organic Chemistry*, John Wiley and Son, New York, 1953, in Chap. 8; and, Pigman and Horton, *The Carbohydrates, Chemistry and Biochemistry*, Academic Press 2nd ed., vol. IA, New York, 1972, in Chap. 11. In regard to the preparation of flavor acetal or ketal groups on polyhydroxylated polymers, reference is made to copending application Yolles, Ser. No. 293,168, filed Sept. 28, 1972. The teachings of the abovementioned literature and patent references are hereby expressly incorporated by reference.

The second step in preparing the compositions described herein is to form flavor particles from the flavor acetals or ketals previously formed. Suitable polymeric matrices include physiologically inert polymeric materials approved for edible products. For chewing gums, the class of materials entitled "masticatory substances" by the FDA are suitable. These include such polymeric materials as: butadiene-silicone rubber copolymers; isobutylene-isoprene copolymers; polyethylene with a molecular weight of 2000 to 21000; polyisobutylene with a minimum molecular weight of 37000; polyvinyl acetate with a minimum molecular weight of 2000; and also would certainly include a copolymer of polyethylene and polyvinyl acetate. Other suitable polymer matrices will be known or easily ascertainable by those skilled in the art.

A suitable technique in performing the intimate dispersion is to form a melt by heating suitable polymer binders with the flavor acetal or ketal. The heated melt can be formed into prills or particles by any of the known techniques such as spraying, etc. Alternatively, the melt can be cooled and after solidification crushed into smaller particles.

For use in chewing gums, it is desirable to have the flavor particles in the range of −25 to +35 in the U.S. Screen Series. Preferably, the particle size will be from −45 to +70.

An additional level of control over the release of flavor is obtainable by coating the flavor particles with a physiologically inert, edible, water-softenable and swellable material. The outer coating should quickly become undectable, particularly with respect to chewing gum bases, as a result of the moisture and temperature conditions encountered upon chewing. It may be desirable that the coating have a hydrophilic nature, as well. Thus, the gritty or grainy texture often experienced with prior art coated flavors is substantially eliminated. Suitable outer coatings are alkali metal or alkaline earth alginates such as calcium alginate, and cellulose derivatives such as hydroxypropyl cellulose and methyl cellulose. Hydroxypropyl cellulose is sold under the tradename KLUCEL by Hercules Chemical, and methyl cellulose is sold under the tradename METHOCEL by Dow Chemical.

These outer coatings can be applied by many methods, including dripping the flavor particles into a liquid solution of the outer coating, or spraying the outer coating on from a solvent such as a mixture of methylene chloride and ethanol.

The sustained flavor release compositions described herein are especially useful in chewing gums. Customarily, chewing gums contain chewing gum base, flavor, sweetener, filler, and certain other optional ingredients.

Chewing gum bases are usually resinous materials and should be non-toxic, clean, odorless, tasteless, colorless, nonsticky, elastic, economical, insoluble in water, resistant to decomposition and depolymerization, resistant to oxidation and embrittlement upon aging, resistant to conversion into toxic products and resistant to flavor dissipation, etc. The primary requirement is, of course, that they impart a permanent chewability to the chewing gum composition. Many natural and synthetic resins have been utilized as chewing gum bases. Chickle is the most widely used natural resin whereas homo- and copolymers of vinyl acetate, sometimes partially hydrolized, are examples of synthetic chewing gum bases. These bases and other customarily used can be used with the sustained flavor release compositions described herein to form chewing gums.

Suitable sweetening agents include sucrose, dextrose, invert sugar, honey, levulose, saccharin, cyclamates, etc.

In like manner, fillers customarily used are also satisfactory. Mineral fillers are used which are finely ground, inert, non-toxic, tasteless and not exceedingly abrasive. In addition, they must not crumble during the chewing process. Inert pigments may also be incorporated into the chewing gum formulations as part of the filler content in order to color the mix. Typical inert pigments and filler materials include: precipitated chalk, clay, barium sulfate, magnesium oxide, silica, talc, carbon black, iron oxide, yellow ochre, magnesium carbonate, calcium sulfate, etc.

Optional additives such as waxes used to lubricate and facilitate the high speed manufacturing process, conditioning agents such as glycerine and propylene glycol, and various medicinal compounds, etc., can, of course, be added to the chewing gum compositions described herein.

The known methods for the preparation of conventional chewing gum products may be employed in preparing chewing gums of this invention. In general, one or more blending operations is required which may be carried out at elevated temperatures followed by the introduction of the homogeneous mass into a mill which forms gum sheets which are subsequently cut into chewing gum sticks.

The proportions of the various ingredients will vary over wide ranges according to the final taste desired. In general, however, it has been found that suitable chewing gums can be prepared using the controlled release flavors of this invention in amounts ranging from about 5 to about 20 percent by weight.

When used in chewing gum or other flavored products, the sustained flavor release compositions described herein can, of course, be combined with other flavors which may or may not be controllably released. For example, chewing gum formulations can be prepared using some of the controlled release flavors described herein as well as some natural flavors and might even include some of the flavors encapsulated by prior art methods.

The following examples further illustrate the invention. All parts and percentages are by weight unless otherwise specified.

EXAMPLE 1

Preparation of the Cyclic Acetal of Cinnamic Aldehyde and Glycerin

In a one-liter, three-neck round bottom flask equipped with a water cooled condenser, stirrer, and a water separator, 66 g. of cinnamic aldehyde is added to 46 g. of glycerin in 200 ml. of dry benzene containing 2 g. of polyphosphoric acid. After 6.5 hours, 8.5 ml. of water are removed from the separator and 200 ml. additional benzene is added to the reaction mixture. After washing with 300 ml. of 1 percent sodium hydroxide solution and rinsing until neutral, the mixture is filtered and the benzene is removed under vacuum. The light yellow solid is then vacuum distilled.

Product identification is based on IR, which shows no carbonyl frequency, and mass spec.

Boiling point 170° at 1.8 mm. Hg, Molecular Weight by Mass Spec. 206.

The cyclic acetal so prepared can be named 2-($\beta$-styryl)-1,3-dioxolane-4-methanol.

EXAMPLE 2

Preparation of Flavor Particles

In a metal pot, 82.8 g. of Elvax (polyethylenepolyvinylacetate copolymer, DuPont grade 210) was heated to a melt. To the melted Elvax, 10 g. of the cyclic acetal were added and stirred in. After cooling in liquid nitrogen, the polymer matrix was reduced to particles. The particles were then separated according to their size.

EXAMPLE 3

Preparation of Coated Flavor Particles

In general, two sizes of particles were used as obtained by the procedure in Example 2. Those passing a No. 16 screen but retained by a No. 35, and those passing a No. 35 but retained by a No. 70.

Each sets of particles were stirred into a 3% sodium alginate solution at 200 RPM. After thorough mixing, these mixtures are allowed to pass into a 8mm. orifice with a tip size dependent on the particles used. For the retained No. 35 particles a 90 mil opening is used. The retained No. 70 use a 65 mil tip. The sodium alginate coated particles are allowed to fall into a room temperature bath of 10 percent calcium lactate solution. After washing, the wet spheres measure approximately 125 mils for the 90 mil tip and about 100 mils for the 65 mil tip. The beads were either air dried or used wet in chewing gum formulation. The air dried chips contained 9.0 percent acetal, 74.6 percent Elvax and 16.4 percent calcium alginate. They are suitable for use in gum formulations, such as that described in Example 5.

EXAMPLE 4

Preparation of Coated Particles by Pan Coating

A sample of 836 grams of acetal-ELvax blend is prepared according to the method of Example 2. Those particles passing a number 35 screen but retained by a number 70 screen are coated in a pan coater with METHOCEL, Dow Chemical Company, 4000 centipoise grade. The METHOCEL is applied by spraying from a 70/30 methylene choride-ethanol solution. The spray is applied intermittently with alternating blasts of hot air to drive off vapors of methylene chloride-ethanol. By this technique, 164 grams Methocel coating is built up so that each particle is completely enveloped with METHOCEL. The air dried chips would be suitable for use in gum formulations, such as that described in the next example.

EXAMPLE 5

Preparation of Chewing Gum

Chewing gum base was melted in a small double boiler and the temperature maintained at approximately 47°C. throughout formulation. The materials, in order of their addition, were:

| | |
|---|---|
| Gum base | 10.50 grams |
| Corn syrup | 3.80 grams |
| Powdered sugar | 6.75 grams |
| Fumaric acid | 0.90 grams |
| Dry flavor particles (Example 3) | 3.60 grams |
| Glycerine/water (50/50) | 0.30 grams |
| Corn oil | 0.12 grams |
| TOTAL | 25.97 grams |

The hot blend was poured onto a Mylar polyethylene terephthalate sheet and then rolled between two Mylar sheets. After chilling, the Mylar was removed. Good flavor release was experienced from the gum even after chewing for 1 hour.

What is claimed is:

1. A controlled-release flavor composition comprising a core of flavor particles and an outer coating of a physiologically inert, edible, water-softenable and swellable material, said flavor particles having a particle size between −25 and +35, U.S. Screen Series, and said flavor particles being formed from an intimate dispersion of a flavor acetal or flavor ketal in a physiologically inert, masticatory polymeric binder, said acetal or ketal comprising a reaction product of a physiologically inert and edible polyhydroxy compound and a physiologically inert and edible flavor aldehyde or ketone, respectively.

2. A composition of claim 1 wherein said polyhydroxy compound is glycerine.

3. A composition of claim 2 wherein said polymeric binder is a masticatory substance.

4. A composition of claim 2 wherein said outer coating is a material selected from hydroxypropyl cellulose, methyl cellulose or an alkali metal or alkaline earth alginate.

5. A composition of claim 4 wherein said masticatory substance is selected from butadiene-silicone rubber copolymer, isobutylene-isoprene copolymer, allyl isobutylene, polyethylene, polyvinyl acetate, polyethylene-polyvinyl acetate copolymer.

6. A composition of claim 1 including a flavor acetal which is the reaction product of cinnamic aldehyde and glycerine.

7. A composition of claim 6 wherein said flavor acetal is intimately dispersed in a binder formed from a copolymer of polyethylene and polyvinyl acetate.

8. A composition of claim 7 wherein said flavor particle is coated with calcium alginate.

9. A composition of claim 1 wherein said polyhydroxy compound is a polymer.

10. A composition of claim 9 wherein said polyhydroxylated polymer is selected from partially hydrolyzed homopolymers or copolymers of vinyl acetate, hydroxy propyl cellulose, hydroxy propyl alginate or polyvinyl alcohol.

11. A composition of claim 10 wherein a flavor acetal is formed from a flavor aldehyde selected from acetaldehyde, banzaldehyde, anisic aldehyde, cinnamic aldehyde, alpha citral, beta citral, decanal, vanillin, ethyl vanillin, heliotropine, α-amyl cinnamaldehyde, butyraldehyde, valeraldehyde, citronellal, decanal, aldehyde C-8, aldehyde C-9, aldehyde C12, 2-ethyl butyraldehyde, hexenal (trans-2), tolyl aldehyde, veratraldehyde, 2,6-dimethyl-5-heptenal, 2,6-dimethyl-octanal; and, 2-dodecenal.

12. A composition of claim 11 wherein a flavor ketal is formed from a flavor ketal selected from d-carvone, l-carvone, diacetyl, benzophenone, methyl ethyl ketone, maltol, menthone, methyl amyl ketone, ethyl butyl ketone, dipropyl ketone, methyl hexyl ketone, ethyl amyl ketone, pyruvic acid, acetanisole, dihydrocarvone, 2,4-dimethylacetophenone, 1,3-diphenyl-2-propanone, acetocumeme, isojasmone, d-isomethylionone, isobutyl acetoacetate, zingerone, pulegone, d-piperitone; and, 2-nonanone.

13. A composition of claim 11 wherein said polymer binder is a polymer selected from butadiene-silicone rubber copolymer, isobutylene-isoprene copolymer, allyl isobutylene, polyethylene, polyvinyl acetate, polyethylene-polyvinyl copolymer.

14. A composition of claim 13 wherein said outer coating is a material selected from hydroxypropyl cellulose, methyl cellulose or an alkali metal or alkaline earth alginate.

15. A composition of claim 12 wherein said polymer binder is a polymer selected from butadiene-silicone rubber copolymer, isobutylene-isoprene copolymer, allyl isobutylene, polyethylene, polyvinyl acetate, polyethylene-polyvinyl copolymer.

16. A composition of claim 15 wherein said outer coating comprises a material selected from hydroxypropyl cellulose, methyl cellulose or an alkali metal alginate.

17. Chewing gum comprising a chewing gum base and a controlled flavor release composition comprising a flavor particle formed from an intimate dispersion of a flavor acetal or a flavor ketal in a physiologically inert polymeric binder, said acetal or ketal comprising a reaction product of a physiologically inert and edible polyhydroxy compound and a physiologically inert and edible flavor aldehyde or ketone, said flavor particle being coated with a physiologically inert, softenable material.

* * * * *